US011345079B2

(12) United States Patent
Tsuchida (10) Patent No.: US 11,345,079 B2
(45) Date of Patent: May 31, 2022

(54) LIQUID DISCHARGE APPARATUS, LIQUID DISCHARGE SYSTEM, LIQUID DISCHARGE METHOD, AND RECORDING MEDIUM

(71) Applicant: Takashi Tsuchida, Kanagawa (JP)

(72) Inventor: Takashi Tsuchida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 276 days.

(21) Appl. No.: 16/276,737

(22) Filed: Feb. 15, 2019

(65) Prior Publication Data
US 2019/0283312 A1    Sep. 19, 2019

(30) Foreign Application Priority Data
Mar. 19, 2018 (JP) .............................. JP2018-051837

(51) Int. Cl.
*B29C 67/00* (2017.01)
*B29C 64/112* (2017.01)
(Continued)

(52) U.S. Cl.
CPC .......... *B29C 64/112* (2017.08); *B29C 64/264* (2017.08); *B29C 64/393* (2017.08);
(Continued)

(58) Field of Classification Search
CPC ... B29C 64/112; B29C 64/264; B29C 64/393; B33Y 10/00; B33Y 30/00; B33Y 50/00; B33Y 50/02
See application file for complete search history.

(56) References Cited

U.S. PATENT DOCUMENTS 5,597,520 A * 1/1997 Smalley ................. B29C 64/40
264/401
2008/0226346 A1* 9/2008 Hull ...................... B29C 64/106
399/177
(Continued)

FOREIGN PATENT DOCUMENTS

EP          2572865 A1    3/2013
JP      2006-272916 A    10/2006
(Continued)

OTHER PUBLICATIONS

Japanese communication with the dispatch No. 814794 issued by the Japan Patent Office dated Nov. 30, 2021 for Japanese Patent Application No. 2018-051837.

*Primary Examiner* — Ryan M Ochylski
(74) *Attorney, Agent, or Firm* — Harness, Dickey & Pierce, P.L.C.

(57) ABSTRACT

A liquid discharge apparatus to form a three-dimensional object with a plurality of layers of ink laminated includes a stage; a discharge head to discharge photocurable ink, toward the stage, for each layer in a height direction of the three-dimensional object; a driver to move the discharge head or the stage relative to the other; an irradiation device to cure the ink, for each layer, with curing light irradiation; and circuitry. The circuitry causes the discharge head to discharge the ink, according to slice data indicating a printing region and a non-printing region in each layer generated by sliding in the height direction of the three-dimensional object, corresponding to movement of the discharge head; and change, in each layer, illuminance of the curing light in the printing region and the non-printing region in accordance with a state of the printing region and the non-printing region indicated by the slice data.

18 Claims, 7 Drawing Sheets

(51) Int. Cl.
*B29C 64/393* (2017.01)
*B29C 64/264* (2017.01)
*B33Y 50/02* (2015.01)
*B33Y 10/00* (2015.01)
*B33Y 30/00* (2015.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2009/0133800 A1 | 5/2009 | Morohoshi et al. |
| 2016/0052211 A1* | 2/2016 | Shimizu ................ B29C 64/129 425/141 |
| 2016/0151980 A1 | 6/2016 | Hatanaka |
| 2018/0141284 A1* | 5/2018 | Wilenski ................ B33Y 10/00 |
| 2018/0370148 A1* | 12/2018 | Sekine ................... B33Y 40/00 |

FOREIGN PATENT DOCUMENTS

| | | |
|---|---|---|
| JP | 2012-101492 | 5/2012 |
| JP | 2013-067016 A | 4/2013 |
| JP | 2013-169670 | 9/2013 |
| JP | 2015-093463 | 5/2015 |
| JP | 2016-107406 | 6/2016 |
| JP | 2016-210016 A | 12/2016 |

\* cited by examiner

FIG. 10

LIQUID DISCHARGE APPARATUS, LIQUID DISCHARGE SYSTEM, LIQUID DISCHARGE METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-051837, filed on Mar. 19, 2018, in the Japan Patent Office, the entire disclosure of which is incorporated by reference herein.

BACKGROUND

Technical Field

The present disclosure relates to a liquid discharge apparatus, a liquid discharge system, a liquid discharge method, and a recording medium.

Discussion of the Background Art

As an example of an image forming apparatus (liquid discharge apparatus), there are known inkjet recording apparatuses that discharge ink from an inkjet head (discharge head) to form a desired image on a printing material (a recording medium) such as a paper sheet. In such an inkjet recording apparatus, as one method for fixing ink discharged from an inkjet onto a printing material, there is a method of discharging an ultraviolet curable ink to form an image and irradiating the ink with ultraviolet rays such that the ink is fixed to the printing material. In addition, there is an already known method for forming a three-dimensional object, of laminating a layer of color ink and a layer of white ink or clear (CL) ink (transparent ink) on a recording medium (support) to form a three-dimensional object.

SUMMARY

According to an embodiment, a liquid discharge apparatus to form a three-dimensional object with a plurality of layers of ink laminated includes a stage; a discharge head to discharge photocurable ink, toward the stage, for each layer in a height direction of the three-dimensional object; a driver to move the discharge head or the stage relative to the other; an irradiation device to cure the ink, for each layer, with curing light irradiation; and circuitry. The circuitry causes the discharge head to discharge the ink, according to slice data, corresponding to movement of the discharge head; and change, in each layer, illuminance of the curing light in the printing region and the non-printing region in accordance with a state of the printing region and the non-printing region indicated by the slice data. The slice data indicates a printing region and a non-printing region in each layer and is generated by sliding in the height direction of the three-dimensional object.

According to another embodiment, a liquid discharge system includes a data generator configured to generate the slice data and the liquid discharge apparatus described above.

Another embodiment provides a liquid discharge method for forming a three-dimensional object with a plurality of layers of ink laminated. The method includes discharging, with a discharge head, photocurable ink, toward a stage, for each layer in a height direction of the three-dimensional object; moving at least one of the discharge head and the stage relative to the other of the discharge head and the stage; irradiating, for each layer, the ink with curing light to cure the ink; controlling the discharging according to slice data indicating a printing region and a non-printing region in each layer generated by sliding in the height direction of the three-dimensional object, corresponding to movement of the discharge head; and changing, in each layer, illuminance of the curing light in each of the printing region and the non-printing region in accordance with a state of the printing region and the non-printing region indicated by the slice data.

Another embodiment provides a non-transitory recording medium storing a plurality of program codes which, when executed by one or more processors, causes the processors to perform the method described above.

BRIEF DESCRIPTION OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are assigned to elements (members or components) having the same function or shape and redundant descriptions thereof are omitted below.

Hereinafter, embodiments of a liquid discharge apparatus, a liquid discharge system, a liquid discharge method, and a recording medium according to the present disclosure will be described in detail referring to FIGS. 1 to 10

(Configuration of Liquid Discharge Apparatus)

Figure 1:
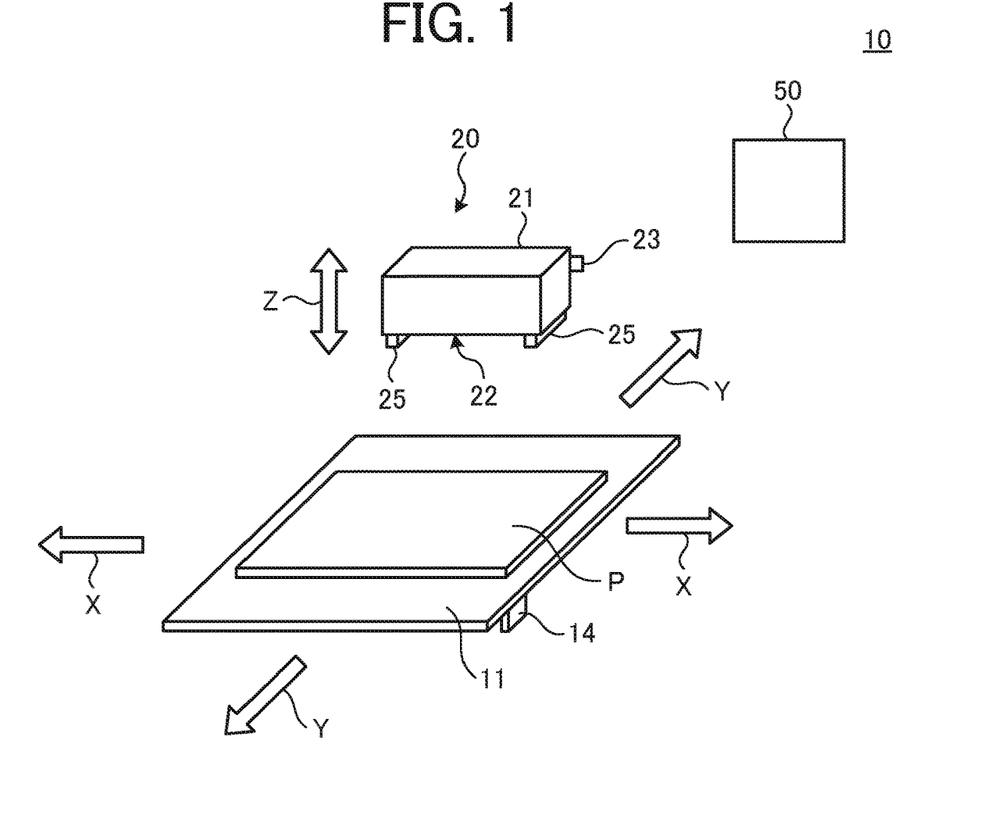
FIG. 1 is a view illustrating an example of a main configuration of a liquid discharge apparatus according to an embodiment.
Figure 2:
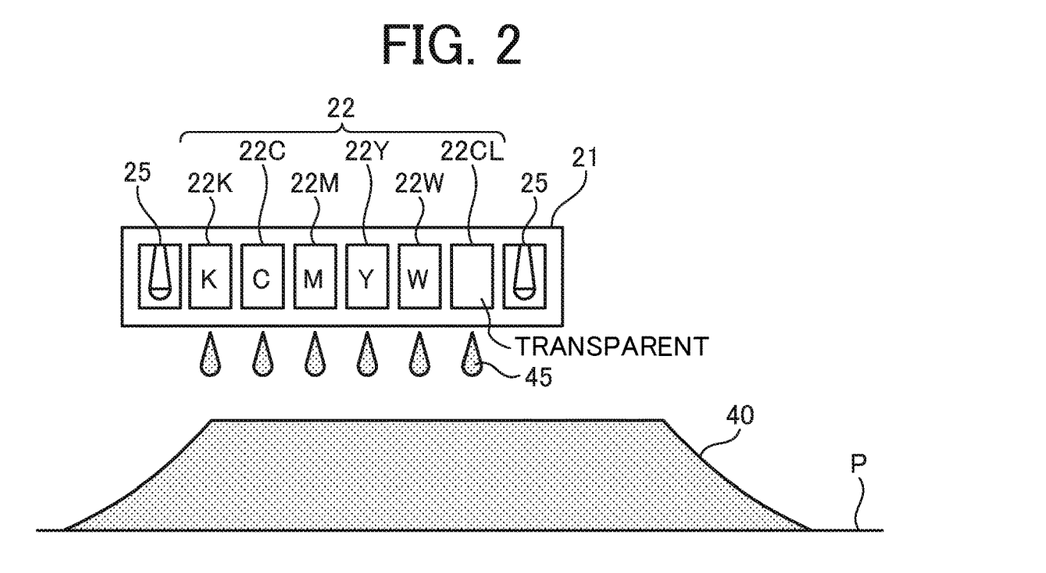
FIG. 2 is a schematic diagram illustrating an example of a configuration of a carriage of the liquid discharge apparatus illustrated in FIG. 1.

FIG. 1 is a view illustrating an example of a main configuration of a liquid discharge apparatus according to the present embodiment. FIG. 2 is a schematic diagram illustrating an example of a configuration of a carriage according to the present embodiment. Referring to FIGS. 1 and 2, a main configuration of a liquid discharge apparatus 10 according to the present embodiment will be described. In the present embodiment, the liquid discharge apparatus 10 illustrated in FIG. 1 is described as an inkjet recording apparatus.

As illustrated in FIG. 1, the liquid discharge apparatus 10 according to the present embodiment includes a stage 11, a stage driving mechanism 14, a three-dimensional object forming unit 20, and a controller 50.

The stage 11 is for holding a support P on which photocurable ink lands and is cured to form a three-dimensional object. Note that the support P may be a flat face or a curved face or the like according to the shape of a finally formed three-dimensional object. The stage 11 may be an object such as a belt, for example.

The stage driving mechanism 14 is a mechanism to move the stage 11 in a vertical direction (Z axis direction), a main scanning direction (X axis direction), and a sub-scanning direction (Y axis direction). The stage driving mechanism 14 includes, for example, various motors, robots, linear actuators, or the like.

The three-dimensional object forming unit 20 is a device that discharges ink for forming a three-dimensional object on the support P. The three-dimensional object forming unit 20 includes a carriage 21 and a carriage driving mechanism 23.

The carriage 21 includes a discharge head 22 and irradiation units 25.

The discharge head 22 is a liquid discharge head disposed on a side of the carriage 21 opposite the support P. The discharge head 22 includes arrays of nozzle holes that are a plurality of discharge openings for discharging ink. As illustrated in FIG. 2, the discharge head 22 includes a plurality of heads, and has a color ink head 22K that discharges black ink droplets, a color ink head 22C that discharges cyan ink droplets, and a color ink head 22M that discharges magenta ink droplets, a color ink head 22Y that discharges yellow ink droplets, a color ink head 22W that discharges white ink droplets, and a clear ink head 22CL that discharges clear ink. The above-described respective color inks and clear ink are photocurable inks (hereinafter, sometimes simply referred to as "inks") such as ultraviolet-curable inks which are cured by irradiation with curing light such as ultraviolet rays. The discharge operation of the ink (droplet 45) discharged from each ink head described above is controlled by a driving pulse applied to a driving element provided corresponding to each nozzle hole of each ink head. As a driving element, for example, a piezoelectric element such as zirconate titanate (PZT) is used.

In the above description, the discharge head 22 includes ink heads that discharge each color and transparent ink respectively. However, the present disclosure is not limited to this, and one ink head may have nozzle holes that discharge respective color inks and transparent ink. In addition, the colors of ink discharged by the discharge head 22 are six colors of black (K), cyan (C), magenta (M), yellow (Y), white (W), and transparent (CL), but are not limited to these colors.

The irradiation unit 25 is a device that performs irradiation with curing light such as ultraviolet light for curing the ink discharged by the discharge head 22. The irradiation unit 25 is, for example, a light emitting diode (LED) or the like. As described above, the ink is cured by the curing light irradiated by the irradiation unit 25, so that a coating film of the ink is formed. The coating film is repeatedly laminated, to fabricate a three-dimensional object. As illustrated in FIGS. 1 and 2, for example, the irradiation unit 25 is disposed at both ends of the array of the ink heads in the X axis direction (the main scanning direction). As described above, the irradiation unit 25 is disposed in the vicinity of the discharge head 22 that discharges the photocurable ink, thereby shortening the time from landing of ink to the curing. Thus, a three-dimensional object with higher precision can be fabricated. It should be noted that the number of the irradiation units 25 of the carriage 21 is not limited to two, and the manner of placement of the irradiation unit 25 is not limited to that illustrated in FIGS. 1 and 2.

The carriage driving mechanism 23 is a mechanism to move the carriage 21 in the vertical direction (Z axis direction), the main scanning direction (X axis direction), and the sub-scanning direction (Y axis direction). The carriage driving mechanism 23 includes, for example, various motors, robots, linear actuators, or the like. In the description above, the support P on the stage 11 is moved by the stage driving mechanism 14, and the carriage 21 is moved by the carriage driving mechanism 23, but embodiments of the present disclosure are not limited to this configuration. For example, other configurations may be used as long as at least one of the support P and the carriage 21 moves, and thereby, the ink lands on arbitrary coordinates on the support P and is cured.

The controller 50 is an apparatus that controls the overall operation of the liquid discharge apparatus 10. Details of the configuration of the controller 50 will be described later referring to FIG. 5.

(Outline of Fabrication Operation)

Figure 3:
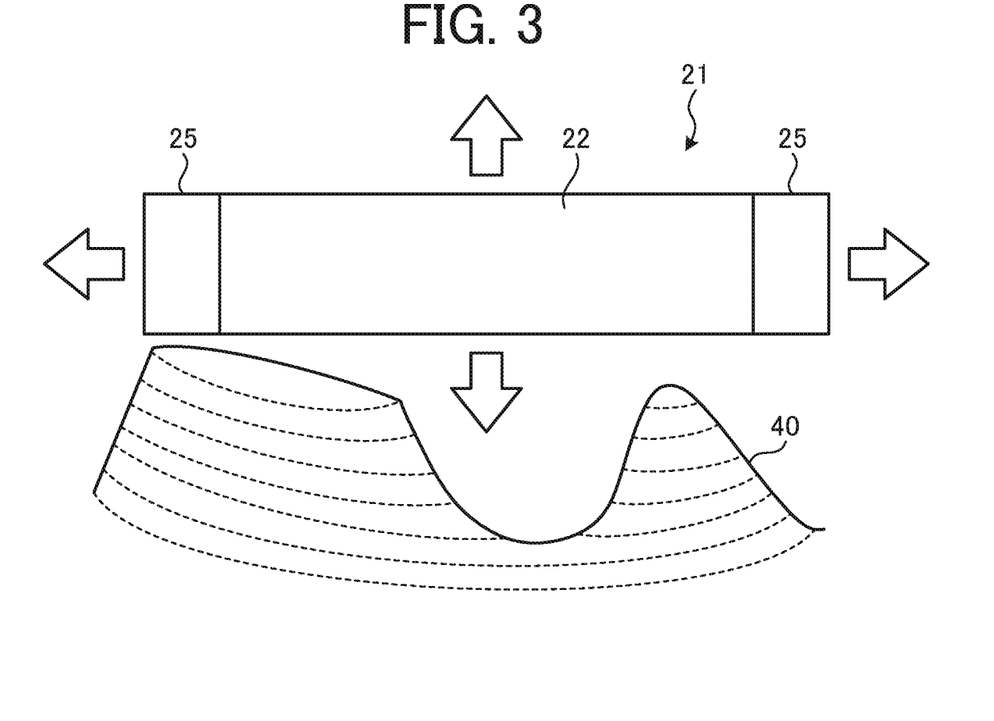
FIG. 3 is a diagram for explaining an outline of fabrication operation of a three-dimensional object of the liquid discharge apparatus according to an embodiment.

FIG. 3 is a diagram for explaining an outline of fabrication operation of a three-dimensional object of the liquid discharge apparatus according to the present embodiment. Referring to FIG. 3, an outline of fabrication operation of a three-dimensional object of the liquid discharge apparatus 10 according to the present embodiment will be described.

The liquid discharge apparatus 10 according to the present embodiment discharges photocurable ink from the discharge head 22 based on print data including three-dimensional information of a three-dimensional object received from outside or the like and irradiates the ink with curing light from the irradiation unit 25 to cure the ink and form a coating film layer. Next, the liquid discharge apparatus 10 moves the carriage 21 upward in the vertical direction by the layer thickness, newly discharges photocurable ink onto the formed coating film, and cures the ink. By repeating this operation, a large number of coating films are laminated to form a three-dimensional object 40.

In a case where there are two or more separated mountain portions like the three-dimensional object 40 illustrated in FIG. 3, for the layers of the same height, the ink is discharged onto desired positions (the printing region corresponding to the mountain portions), and is cured, in the same printing operation.

Figure 4:
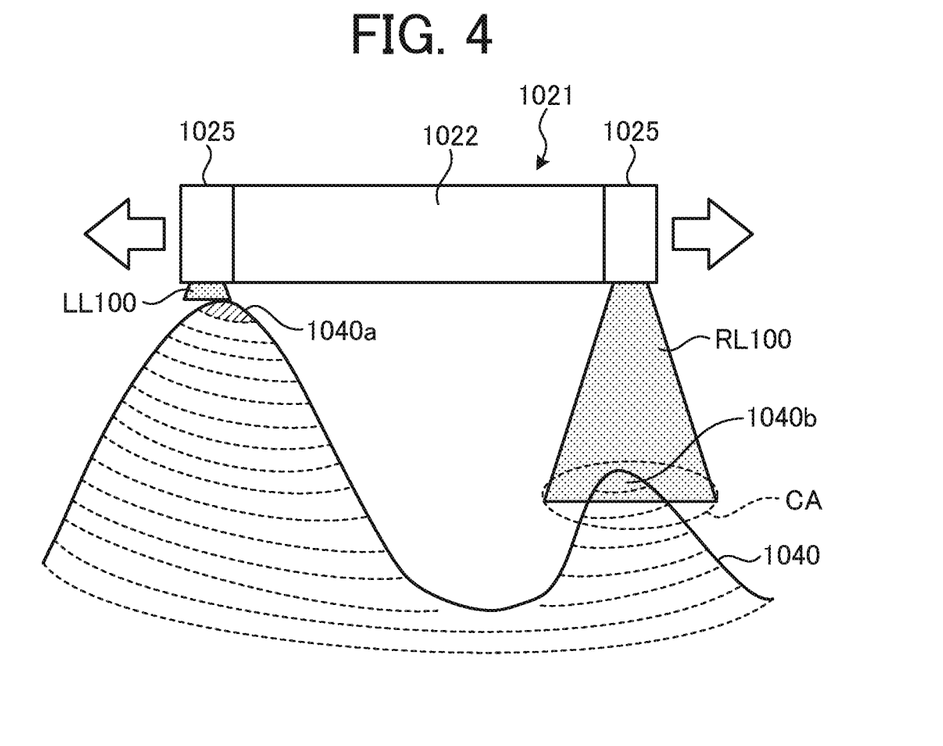
FIG. 4 is a diagram for explaining a comparative three-dimensional object fabrication operation.

FIG. 4 is a diagram for explaining a comparative three-dimensional object fabrication operation.

As illustrated in FIG. 4, the comparative liquid discharge apparatus includes a carriage 1021 on which a discharge head 1022 that discharges ink and irradiation units 1025 that performs curing-light irradiation are mounted.

A description is given of a case where the comparative liquid discharge apparatus forms a coating film by irradiation light LL100 from the irradiation unit 1025 on the left side in the high layer portion (a portion 1040*a*) of the three-dimensional object (a three-dimensional object 1040 in the example of FIG. 4). In this case, the carriage 1021 is raised high, and an already-formed portion 1040*b* is also irradiated in an irradiation region CA by irradiation light RL100 from the irradiation unit 1025 on the right side. Therefore, the portion 1040*b* is excessively irradiated with curing light, resulting in image defects such as discoloration of the surface and degradation of the fabricated object. Since light naturally diffuses from a light source, when the carriage 1021 is raised high in order to form a high layer (the portion 1040*a*), as illustrated in the irradiation region CA of FIG. 4, unnecessary irradiation region is further widened.

In order to prevent excessive irradiation to the already-formed coating film, the illuminance of the curing light of the irradiation unit 1025 may be lowered. In this case, the ink in the low layer portion can be cured by the accumulated amount of curing light. On the other hand, in the high layer portion, due to insufficient illuminance of the curing light (insufficient amount of light), the ink remains uncured, and desired fabrication may not be performed or color mixing with nearby ink may occur.

In order to prevent the disadvantages as described above, there are methods of providing the irradiation unit 1025 separately from the carriage 1021, switching the irradiation unit 1025 depending on the height at which a coating film is formed, or providing an additional irradiation unit 1025 to perform curing-light irradiation with low illuminance a plurality of times depending on the circumstances. However, in either case, the apparatus configuration of the liquid discharge apparatus becomes complicated, and the time during which each apparatus operates leads to prolongation of printing time, and productivity is deteriorated.

(Hardware Configuration of Liquid Discharge Apparatus)

Figure 5:
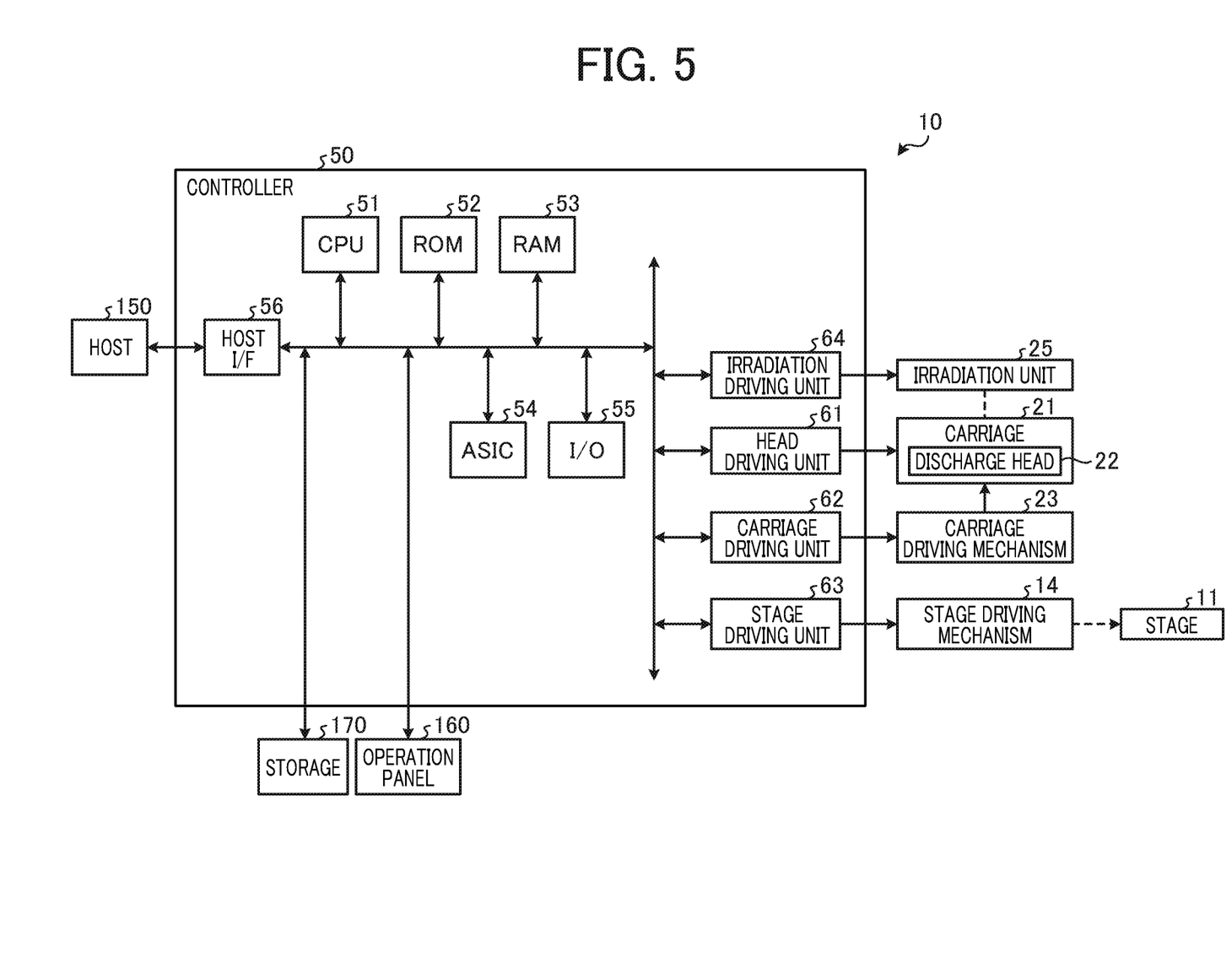
FIG. 5 is a diagram illustrating an example of a hardware configuration of a liquid discharge apparatus according to an embodiment.

FIG. 5 is a diagram illustrating an example of a hardware configuration of a liquid discharge apparatus according to the present embodiment. Referring to FIG. 5, the hardware configuration of the liquid discharge apparatus 10 according to the present embodiment will be described.

As illustrated in FIG. 5, the liquid discharge apparatus 10 according to the present embodiment includes the controller 50, an operation panel 160, and a storage 170. The liquid discharge apparatus 10 includes the stage 11, the stage driving mechanism 14, the carriage 21, the carriage driving mechanism 23, and the irradiation units 25 as described above.

The controller 50 is an apparatus that controls the overall operation of the liquid discharge apparatus 10. As illustrated in FIG. 5, the controller 50 includes a central processing unit (CPU) 51, a read only memory (ROM) 52, a random access memory (RAM) 53, an application specific integrated circuit (ASIC) 54, an input and output (I/O) 55, a host interface (I/F) 56, a head driving unit 61, a carriage driving unit 62, a stage driving unit 63, and an irradiation driving unit 64.

The CPU 51 is an arithmetic device that controls the overall operation of the liquid discharge apparatus 10. The ROM 52 is a nonvolatile memory that holds data and programs even while the power of the liquid discharge apparatus 10 is cut off. The RAM 53 is a volatile memory that functions as a work area (work region) of the CPU 51.

The ASIC 54 is an integrated circuit for processing various signals for print data or image data, image processing for rearranging or the like, or processing other input and output signals for controlling the entire liquid discharge apparatus 10.

The I/O 55 is an interface for inputting detection signals from various sensors or the like. The host I/F 56 is an interface for exchanging data (print data or the like) and signals with a host 150 side. The host I/F 56 is, for example, a network interface conforming to the transmission control protocol (TCP)/the Internet protocol (IP). Note that the host I/F 56 may be an interface such as universal serial bus (USB) or the like.

The head driving unit 61 controls the driving of the discharge head 22. The head driving unit 61 transfers print data (slice data and illuminance map or the like described later) to the drive circuit inside the discharge head 22 as serial data. At this time, the head driving unit 61 generates transfer clocks and latch signals for transfer of print data, confirmation of transfer, or the like, and drive waveforms used for discharging ink droplets from the discharge head 22, and outputs the generated result to the driving circuit in the inside of the discharge head 22. The driving circuit inside the discharge head 22 selectively inputs the drive waveform corresponding to the input print data to the piezoelectric element (actuator) of each nozzle of the discharge head 22.

Under the control of the CPU 51, the carriage driving unit 62 controls driving of the carriage driving mechanism 23 to move the carriage 21 in the vertical direction (Z axis direction), the main scanning direction (X axis direction), and the sub-scanning direction (Y axis direction).

Under the control of the CPU 51, the stage driving unit 63 controls driving of the stage driving mechanism 14 to move the stage 11 in the vertical direction (Z axis direction), the main scanning direction (X axis direction), and the sub-scanning direction (Y axis direction).

The irradiation driving unit 64 performs irradiation control of the curing light by the irradiation unit 25 under the control of the CPU 51. Specifically, the irradiation driving unit 64 controls the irradiation timing, the illuminance, the irradiation time (light amount), and the like of the curing light.

The operation panel 160 accepts various inputs according to the user's operation and displays various information (for example, information corresponding to the accepted operation, information indicating the operation state of the liquid discharge apparatus 10, a setting screen, or the like), and has an input function and a display function. The operation panel 160 includes, for example, a liquid crystal display (LCD) device equipped with a touch panel function. Note that the operation panel 160 is not limited to a liquid crystal display device and may include a display device of an organic electro-luminescence (EL) equipped with a touch panel function, for example. In addition to or in place of the touch panel function, the operation panel 160 may be provided with an operation unit such as a hardware key or a display such as a lamp.

The storage 170 is a nonvolatile storage device that stores print data, setting information, various programs, or the like. The storage 170 is, for example, a flash memory, a hard disk drive (HDD), a solid state drive (SSD), or the like.

The hardware configuration of the liquid discharge apparatus 10 illustrated in FIG. 5 is an example, and it is not necessary to include all of the constituent elements illustrated in FIG. 5, or the hardware configuration may include other constituent elements.

(Configuration and Operation of Liquid Discharge Apparatus)

Figure 6:
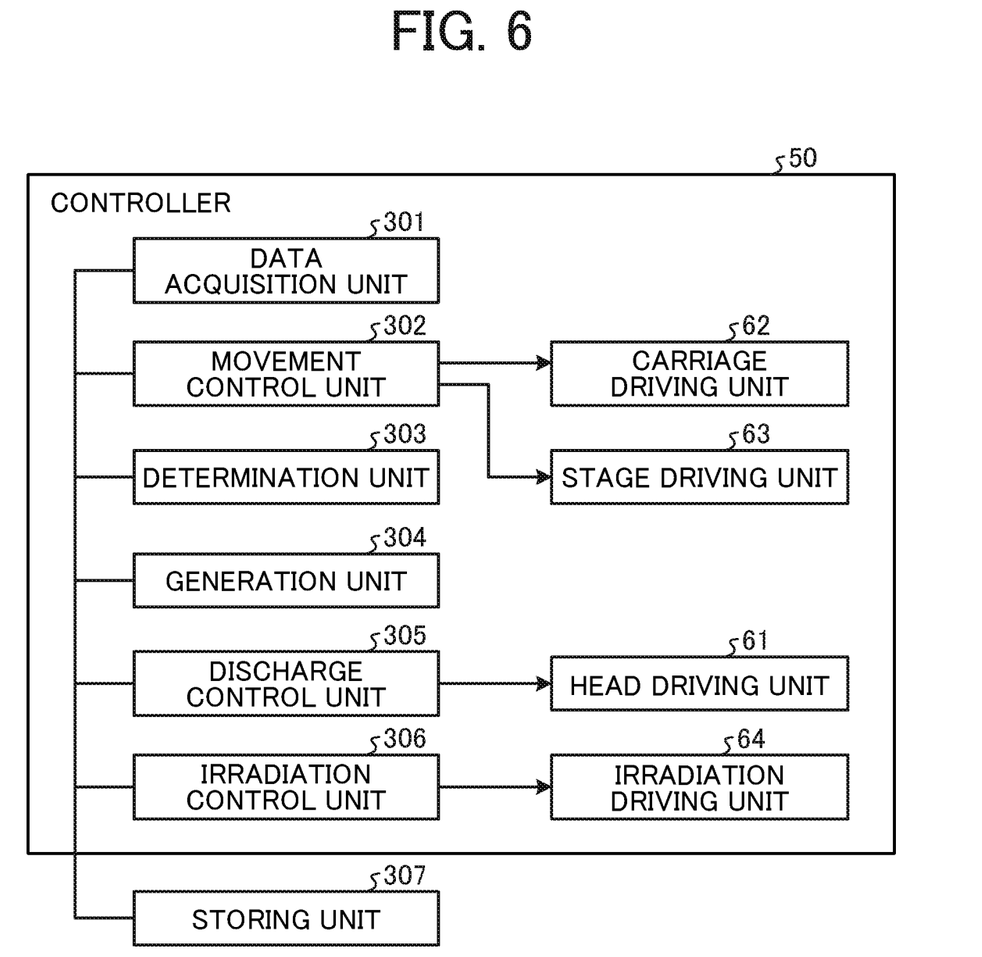
FIG. 6 is a diagram illustrating an example of a functional block configuration of the liquid discharge apparatus according to an embodiment.

FIG. 6 is a diagram illustrating an example of a functional configuration of the liquid discharge apparatus according to the present embodiment. Referring to FIG. 6, the configuration and functional of the liquid discharge apparatus 10 according to the present embodiment will be described.

As illustrated in FIG. 6, the controller 50 of the liquid discharge apparatus 10 according to the present embodiment includes a data acquisition unit 301, a movement control unit 302, a determination unit 303, a generation unit 304, a discharge control unit 305, and an irradiation control unit 306. The liquid discharge apparatus 10 includes a storing unit 307 in the outside of the controller 50.

The data acquisition unit 301 is a functional unit that acquires print data from the outside (the host 150 or the like). The data acquisition unit 301 is implemented by, for example, a program executed by the host I/F 56 and the CPU 51 illustrated in FIG. 5. The data acquisition unit 301 may acquire the print data (which can be print data from an external data generator, such as the host 150 or a computer, or print data generated by the liquid discharge apparatus 10) stored in the storing unit 307. The data acquisition unit 301 may acquire slice data (described later) of a three-dimensional object from the outside.

The movement control unit 302 is a functional unit that controls the movement driving of the carriage 21 by the carriage driving unit 62 and the carriage driving mechanism 23 and the movement driving of the stage 11 by the stage driving unit 63 and the stage driving mechanism 14. That is, the movement control unit 302 moves the carriage 21 relative to the stage 11. The movement control unit 302 is implemented by, for example, a program executed by the CPU 51 illustrated in FIG. 5.

The determination unit 303 is a functional unit that determines the following, from the slice data indicating the print regions in the case where the three-dimensional object indicated by the print data is sliced in each layer in the height direction. For example, the determination unit 303 determines how high the layer is, whether the printing region includes two or more portions, whether the width (or area) of the printing region is equal to or greater than a predetermined value, and whether the distance between the printing regions is equal to or greater than a predetermined distance. For example, the predetermined width and the predetermined distance are empirical determined and preliminarily stored in a memory by a manufacturer of the liquid discharge apparatus 100. The determination unit 303 is implemented by, for example, a program executed by the CPU 51 illustrated in FIG. 5. The liquid discharge apparatus 10 can include another functional unit that generates slice data from print data. Alternatively, the determination unit 303 can generate slice data. As described above, the data acquisition unit 301 can acquire externally generated slice data.

The generation unit 304 is a function unit that generates an illuminance map based on the determination result by the determination unit 303. The illuminance map represents assignment as to the degree of illuminance of the curing light used in irradiation in each region (printing region and non-printing region) of slice data obtained from print data.

Specifically, the generation unit 304 generates an illuminance map in the X axis direction for each Y coordinate (line by line) in which fabrication operation is performed on the slice data, for example. The generation unit 304 is implemented by, for example, a program executed by the CPU 51 illustrated in FIG. 5.

The discharge control unit 305 is a functional unit that controls the discharge operation of the ink of the discharge head 22 by the head driving unit 61. The discharge control unit 305 generates information that defines a drive waveform (driving voltage) to be applied to the discharge head 22 for discharge operation, and the head driving unit 61 generates a drive waveform according to the information. The discharge control unit 305 is implemented by, for example, a program executed by the CPU 51 illustrated in FIG. 5.

The irradiation control unit 306 is a functional unit that controls the irradiation operation of the curing light of the irradiation unit 25 by the irradiation driving unit 64 according to the illuminance map. The irradiation control unit 306 generates information that defines the irradiation operation from the illuminance map (for example, information that defines the irradiation timing, the illuminance, the irradiation time (the light amount), or the like of the curing light), and the irradiation driving unit 64 performs or stops the irradiation with the curing light according to the information. The irradiation control unit 306 is implemented by, for example, a program executed by the CPU 51 illustrated in FIG. 5.

The storing unit 307 is a functional unit that stores various types of data. Specifically, the storing unit 307 stores print data, slice data, illuminance map, setting information, various programs, or the like. The storing unit 307 is implemented by the storage 170 illustrated in FIG. 5, for example.

Note that some or all of the data acquisition unit 301, the movement control unit 302, the determination unit 303, the generation unit 304, the discharge control unit 305, and the irradiation control unit 306 may not software programs, and may be implemented by a hardware circuit such as the field-programmable gate array (FPGA).

The data acquisition unit 301, the movement control unit 302, the determination unit 303, the generation unit 304, the discharge control unit 305, and the irradiation control unit 306 described above are conceptual representation of functions, and functional configurations of embodiments are not limited thereto. For example, a plurality of functional units that are independent from each other in FIG. 6 can be combined into one functional unit. By contrast, a plurality of functions of one functional unit in FIG. 6 can be divided and allocated to a plurality of functional units.

The liquid discharge apparatus 10 according to the present embodiment laminates the coating film from the bottom, to fabricate a three-dimensional object. In this case, if the low layer portion is kept being irradiated with the curing light during the formation of the high layer, discoloration of the excessively irradiated portion and image defects are caused, degrading the fabricated object. In particular, the tendency is strong for three-dimensional objects having surface irregularities.

Therefore, in principle, the liquid discharge apparatus 10 according to the present embodiment adjusts the illuminance to lower the illuminance in the formation of the coating film of the low layer portion, which is highly likely to be kept irradiated with the curing light throughout the printing operation, and increase the illuminance in the formation of the coating film of the high layer portion, where the number of times of irradiation with the curing light is smaller. In this case, the illuminance may be adjusted for each layer or a unit of several layers. That is, the irradiation control unit 306 sets a basic illuminance (i.e., a reference illuminance) of the curing light of the irradiation unit 25 for curing the coating film for each layer in the height direction of the three-dimensional object to be formed. Such setting of the basic illuminance may be changed according to the type of ink, the system configuration, or the like. The height of the three-dimensional object can be grasped based on the ordinal number of layer with which the slice data corresponding to the illuminance map coincides or grasped based on the height of the three-dimensional object detected by a separately provided sensor. In the description above, the basic illuminance is decreased in the formation of the coating film in the low layer portion and increased in the formation of the coating film in the high layer portion, where the number of times of irradiation with the curing light is smaller. However, the same basic illuminance may be used for all layers.

Next, operation of switching the illuminance according to the state of the printing region in each layer will be described.

Figure 7:
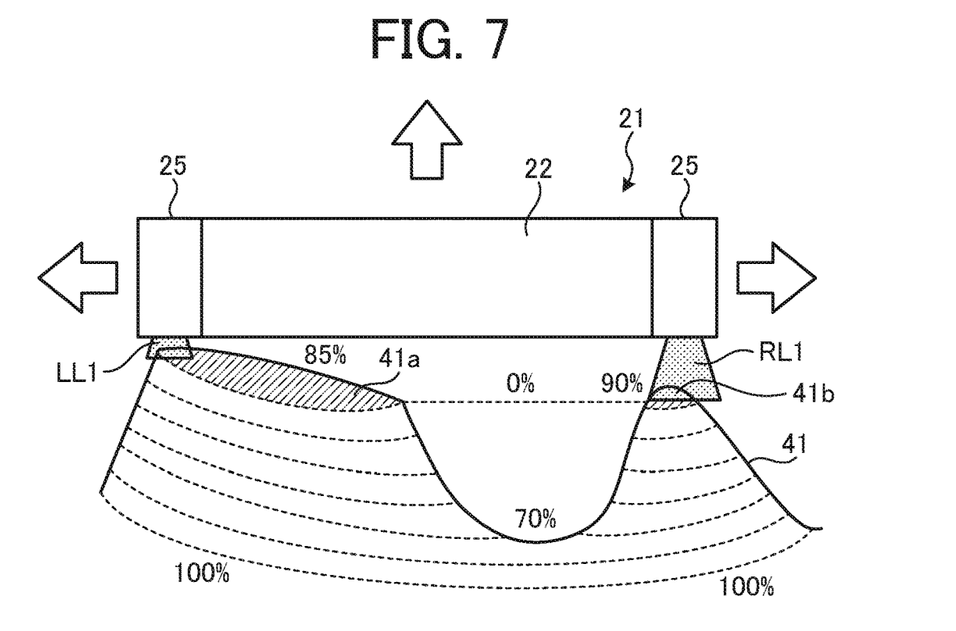
FIG. 7 is a diagram for explaining operation of changing illuminance according to a printing region of each layer of a three-dimensional object.

FIG. 7 is a diagram for explaining operation of changing illuminance according to a printing region of each layer of a three-dimensional object. Referring to FIG. 7, first, operation of changing illuminance according to a printing region of each layer of a three-dimensional object will be described.

In the example illustrated in FIG. 7, in a three-dimensional object 41, a layer being formed (a target layer, fabrication operation for which is ongoing) includes two printing regions (portion 41a and portion 41b), and the distance between the printing regions is sufficiently large (for example, when equal to or larger than a distance d0 illustrated in FIG. 9 to be described later). In this case, if a region (non-printing region) where there is no fabrication portion in the target layer is irradiated with the curing light, the curing light strikes the already-formed coating film in the low layer portion, corresponding to the non-printing region. Therefore, the irradiation control unit 306 sets the illuminance of the curing light (irradiation light LL1 and irradiation light RL1) to the minimum (for example, the illuminance of 0% with respect to the basic illuminance of the target layer) in the non-printing region in this case. Such setting can reduce the amount of irradiation of a region without fabrication portion (non-printing region) outside the printing region in the target layer, that is, reduce irradiation of the low layer portion of the non-printing region, where a coating film has already been formed. Accordingly, such setting can suppress the discoloration and the image defects caused by excessive irradiation, and resultant deterioration of the fabricated object.

On the other hand, there are cases where the target layer under film formation includes two printing regions and the distance between the printing regions is small (for example, smaller than the distance d0 illustrated in FIG. 9 to be described later). In this case, if a portion that is not a fabrication portion (a non-printing region) is not irradiated, the amount of curing light may become insufficient or performing irradiation again for the next printing region may be difficult. Therefore, for example, in the non-printing region, the irradiation control unit 306 sets the illuminance of curing light (the irradiation light LL1 and the irradiation light RL1) to the degree capable of preventing shortage of light amount of irradiation of the printing region (in the example of FIG. 7, for example, illuminance of 70% of the basic illuminance of the target layer). Such setting can prevent shortage of the light amount in the printing region due to extreme decrease in illuminance in the non-printing region, suppress uncured ink due to insufficient light amount, suppress color mixture and flow out of ink to other than landing position, and suppress image quality defects.

A detailed description with be given later, referring to FIG. 9, of the illuminance of the curing light (the irradiation light LL1 and the irradiation light RL1) of the irradiation unit to the portions 41a and 41b which are printing regions indicated in FIG. 7.

Figure 8:
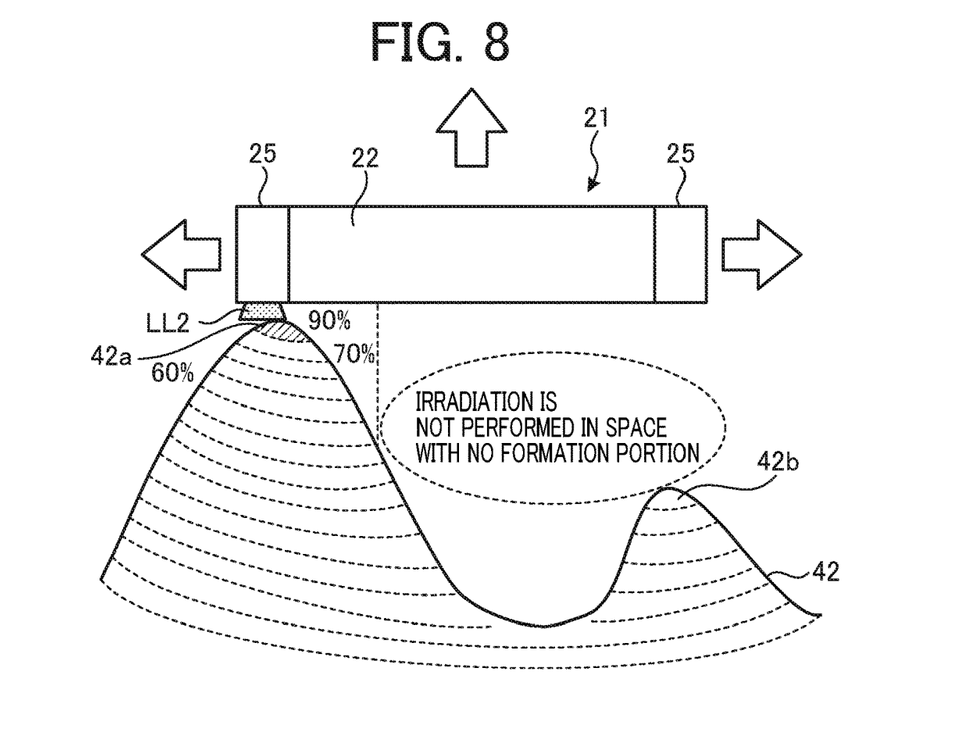
FIG. 8 is a diagram for explaining not irradiating a region that is not the printing region.

FIG. 8 is a diagram for explaining not irradiating a region that is not the printing region. Referring to FIG. 8, operation of not irradiating a non-printing region which is not a printing region will be described.

In FIG. 8, a target layer under film formation in a three-dimensional object 42 includes one printing region (a portion 42a), and there is no other printing region. In this case, if the non-printing region where the target layer does not include a fabrication portion, the curing light strikes the low layer portion (a portion 42b) which has already been formed, corresponding to the non-printing region. When the width in the X axis direction (the main scanning direction) of the printing region (the portion 42a) at one position is very small (for example, smaller than a predetermined width W0 indicated in FIG. 9 described later), due to insufficient light amount of curing light in the printing region, uncured ink, color mixture, the flow out of ink to other than landing position, or the like may occur. Therefore, in the non-printing region, the irradiation control unit 306 does not perform irradiation with the curing light (the irradiation light LL1 and the irradiation light RL1), and in the printing region having an extremely small width (the portion 42a), sets the illuminance of curing light (the irradiation light LL2) to the degree capable of preventing shortage of the light amount (in the example of FIG. 8, for example, illuminance of 90% of the basic illuminance for the target layer). Such setting can reduce, in the non-printing region, irradiation of the low layer portion where the coating film has already been formed. Therefore, such setting can suppress the discoloration and the image defects of the fabrication portion, and resultant deterioration of the fabricated object due to excessive irradiation further, in the printing region, such setting can suppress color mixture and the flow out of ink from the landing position due to the insufficient light amount, thereby suppressing image quality defects.

Figure 9:
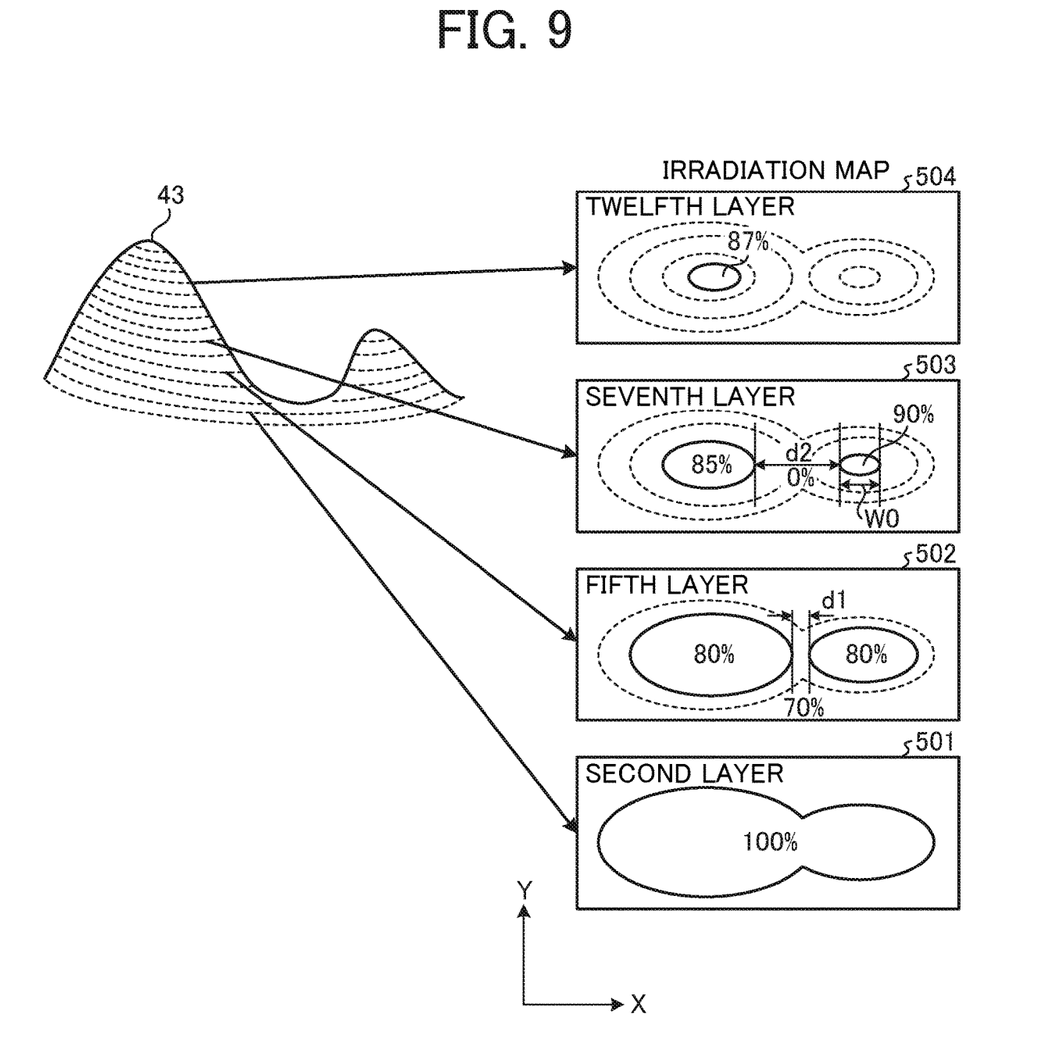
FIG. 9 is a diagram for explaining an illuminance map according to the states of the printing region and the non-printing region of each layer of the three-dimensional object.

FIG. 9 is a diagram for explaining an illuminance map according to the states of the printing region and the non-printing region of each layer of the three-dimensional object. Referring to FIG. 9, an illuminance map according to the states of the printing region and the non-printing region of each layer of the three-dimensional object will be explained.

The print data acquired from the outside by the data acquisition unit 301 is three-dimensional data of a three-dimensional object (for example, a three-dimensional object 43 illustrated in FIG. 9) formed by the liquid discharge apparatus 10. From the print data, slice data indicating the printing region and the non-printing region in the case of slicing in each layer in the height direction of the three-dimensional object is obtained. The determination unit 303 uses the slice data to determine the states of the printing region and the non-printing region of each layer. Examples of the states include the position in the height direction, size, and relation with adjacent region. Specifically, for example, the determination unit 303 determines how high the layer is, whether the printing regions are two or more, whether the width (or area) of the printing region is equal to or greater than the predetermined value, and whether the distance between the printing regions is equal to or greater than the predetermined distance. The generation unit 304 generates an illuminance map representing assignment as to with what degree of illuminance of the curing light the irradiation is performed in the printing region and non-printing region indicated in each piece of slice data, based on the determination result by the determination unit 303. Examples of the illuminance map generated from the print data indicating the three-dimensional object 43 and the slice data are illustrated in illuminance maps 501 to 504 in FIG. 9. For example, the illuminance map 502 of the fifth layer indicates that the illuminance in the two printing regions is 80% of the basic illuminance and the illuminance in the non-printing region between the printing regions is 70% of the basic illuminance. The X axis direction in FIG. 9 indicates the main scanning direction in which the discharge head 22 discharges ink, and the Y axis direction indicates the direction in which the support P as the printing medium or the discharge head 22 is conveyed (the sub-scanning direction). Note that the above-described manners of the main scanning direction and the sub-scanning direction are not limited to this but may be defined differently depending on the configuration of the liquid discharge apparatus 10.

Here, when the carriage 21 moves in the main scanning direction, the distance d0 is the minimum width with which the illuminance of the curing light of the irradiation unit 25 can be switched. The distance d0 can be determined by the product (V×Δt) between the speed V of the carriage 21 and time Δt from when the irradiation control unit 306 actually reads a value transmitted from the outside (e.g., the host 150) or previously stored in, e.g., a memory to when the irradiation control unit 306 switches the illuminance of the curing light of the irradiation unit 25.

First, with the illuminance map 502 of the fifth layer as an example, the way to obtain illuminance in each area will be described. Two printing regions are indicated in the illuminance map 502 (or the slice data that is base of generation of the illuminance map 502). Accordingly, as described above referring to FIG. 7, unless irradiation is performed in a portion which is not a fabrication portion (non-printing region), the light amount of the curing light becomes insufficient or irradiating again the next printing region becomes difficult. Therefore, for example, in the non-printing region between the printing regions, the irradiation control unit 306 sets the illuminance of curing light to 70% of the basis illuminance, for example, so that the degree of illuminance is set to the degree capable of suppressing shortage of the light amount to the printing region. In this case, the illuminance of the non-printing region can be obtained by multiplying the basic illuminance by a predetermined percentage as described above or multiplying the illuminance for the adjacent printing region (printing region of illuminance of 80% in the illuminance map 502) by a predetermined percentage.

Next, with the illuminance map 503 of the seventh layer as an example, the way to obtain illuminance in each area will be described. Two printing regions are indicated in the illuminance map 503 (or the slice data that is base of generation of the illuminance map 503). The distance d2 between the two printing regions is sufficiently larger than the above-mentioned distance d0. Accordingly, as described above referring to FIG. 7, if irradiation is performed in a non-printing region without a fabrication portion in the target layer, the curing light strikes the low layer portion, which has already been formed, corresponding to the non-printing region of the target layer. Therefore, for example, the irradiation control unit 306 sets the illuminance of the curing light to 0% of the basic illuminance in the non-printing region between the printing regions.

In the illuminance map 503, when the width in the X axis direction (the main scanning direction) of the printing region on the right side is smaller than the predetermined width W0 described above, due to insufficient light amount of curing light in the printing region, uncured ink, color mixture, the flow out of ink to other than landing position, or the like may occur. Therefore, the irradiation control unit 306 sets the illuminance of curing light (about 90% of the basic illuminance in the example of FIG. 9) to the degree capable of preventing shortage of the light amount in the printing region having an extremely small width (small-width printing region) smaller than the predetermined width W0. In this case, in order to prevent shortage of the light amount in the small-width printing region as described above, the irradiation control unit 306 can apply the curing light to the small-width printing region from outside the printing region to an extent not affecting the already formed fabrication portion.

The illuminance in the printing region in each illuminance map may be appropriately assigned based on, for example, the width in the X axis direction of the printing region. For example, when the width in the X axis direction is W0 or more, the illuminance may be determined based on the width (for example, in proportion to or in inverse proportion to the width). For example, illuminance is assigned in inverse proportion to the width of the printing region in the printing region indicated in the illuminance maps 502 to 504. As indicated in the illuminance map 501, irradiation may be performed with the basic illuminance (that is, 100%), since the influence on other coating film (fabrication portion) is small in the printing region of the extremely low layer.

For the setting of the illuminance in each region in the illuminance map, each of the above-described determination methods of the illuminance may be used alone, or a combination of a plurality of determination methods may be used. Instead of uniform illuminance for the printing region of each illuminance map illustrated in FIG. 9, for example, a control for increasing the illuminance toward the center of the printing region may be incorporated. In portions with no description of the illuminance in each illuminance map illustrated in FIG. 9, in principle, irradiation with curing light may not be performed.

Although the illuminance is constant throughout that printing region in each printing region illustrated in the illuminance maps 501 to 504 in FIG. 9, the present disclosure is not limited thereto. In the actual discharge operation by the discharge head 22, one line discharge operation is performed in the X axis direction (the main scanning direction). Then, the support P or the discharge head 22 is moved by one line in the Y axis direction (the sub-scanning direction), and discharge operation is performed in the X axis direction with respect to a new line. Therefore, for each line in the X axis direction, the determination unit 303 can determine whether the printing regions are two or more, whether the width (or area) of the printing region is equal to or greater than the predetermined value, and whether the distance between the printing regions is equal to or greater than the predetermined distance, or the like, and the generation unit 304 can generate an illuminance map based on the determination result by the determination unit 303 for each line in the X axis direction.

Figure 10:
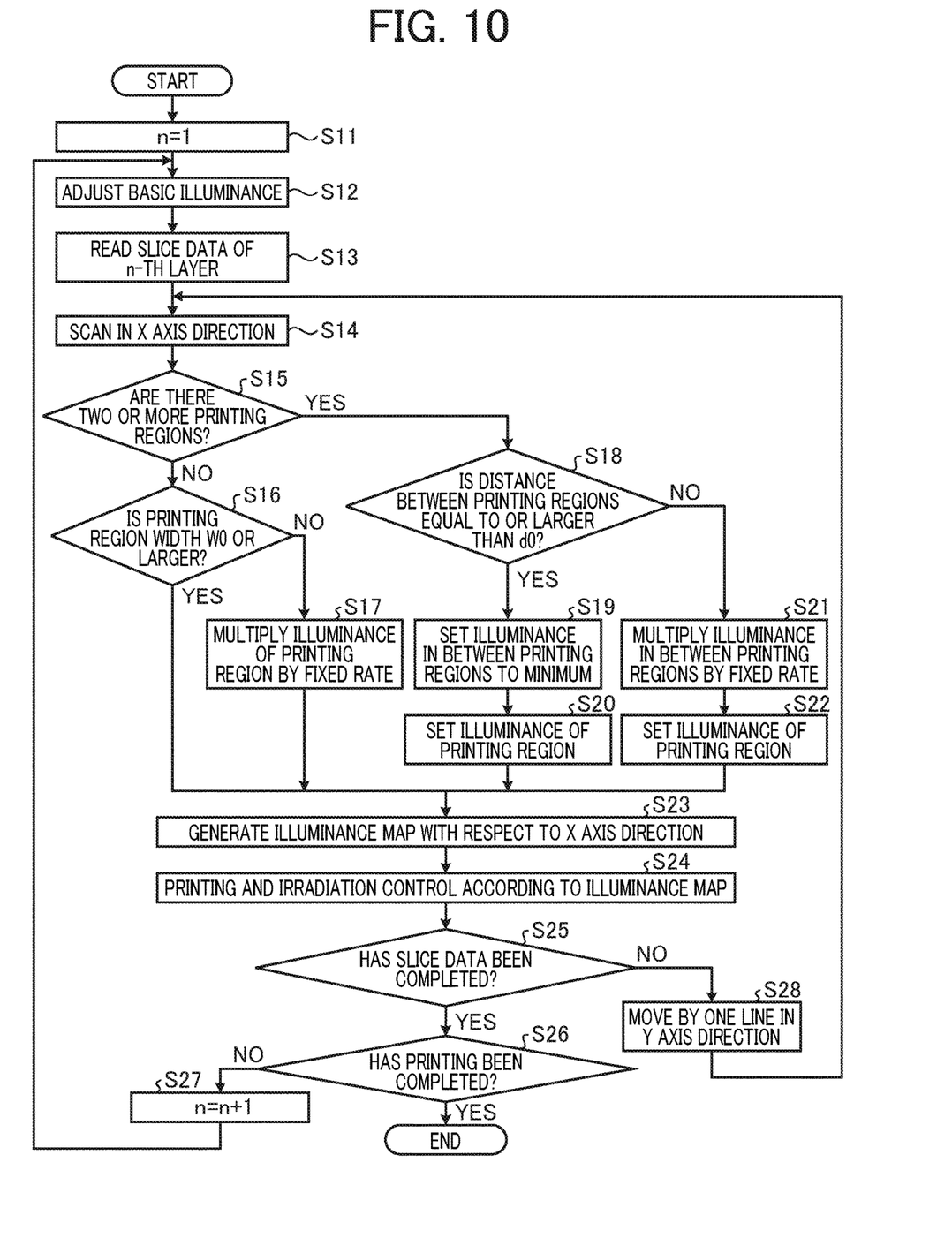
FIG. 10 is a flowchart illustrating an example of three-dimensional object fabrication processing of the liquid discharge apparatus, according to an embodiment.

FIG. 10 is a flowchart illustrating an example of three-dimensional object fabrication processing of the liquid discharge apparatus according to the present embodiment. As illustrated in FIG. 10, a flow of three-dimensional object fabrication processing of the liquid discharge apparatus 10 according to the present embodiment will be described. It is assumed that the data acquisition unit 301 has acquired print data indicating a three-dimensional object to be fabricated in the three-dimensional object fabrication processing.

<Step S11>

The controller 50 sets the ordinal number of the layer (target layer) to be fabricated to "1" (n=1). Then, the process proceeds to step S12.

<Step S12>

The irradiation control unit 306 adjusts (sets) the basic illuminance of the curing light of the irradiation unit 25 used for the coating film fabrication operation in the target layer. In this case, the illuminance may be adjusted for each layer or a unit of several layers. Then, the process proceeds to step S13.

<Step S13>

The determination unit 303 reads slice data of the n-th layer (target layer). Then, the process proceeds to step S14.

<Step S14>

In order to check the state of the printing region and the non-printing region indicated by the slice data, the determination unit 303 scans the target line, in the X axis direction, for which ink discharge is performed. Then, the process proceeds to step S15.

<Step S15>

The determination unit 303 determines whether there are two or more printing regions on the target line. When there is only one print region (step S15: No), the process proceeds to step S16. When there are two or more printing regions (step S15: Yes), the process proceeds to step S18.

<Step S16>

The determination unit 303 determines whether the width of the printing region in one position on the target line is equal to or greater than the predetermined width W0. When the width is equal to or greater than the predetermined width W0 (step S16: Yes), the generation unit 304 appropriately performs assignment based on the width of the printing region, and the process proceeds to step S23. On the other hand, when the width is smaller than the predetermined width W0 (step S16: No), the process proceeds to step S17.

<Step S17>

When the determination unit 303 determines that the width of the printing region is smaller than the predetermined width W0, the generation unit 304 generates, as the illuminance of the printing region, the illuminance obtained by multiplying the basic illuminance by a predetermined percentage, which is a fixed rate (90% in the example of FIG. 9), so that the illuminance is the degree capable of preventing shortage of the light amount. In other words, the generation unit 304 changes the illuminance to a value higher than the illuminance assigned to the printing region whose width is determined to be equal to or larger than the predetermined width W0. Then, the process proceeds to step S23.

<Step S18>

The determination unit 303 determines whether the distance between the two printing regions on the target line is equal to or greater than the distance d0. When the distance is equal to or greater than the distance d0 (step S18: Yes), the process proceeds to step S19. When the distance is smaller than the distance d0 (step S18: No), the process proceeds to step S21.

<Step S19>

When the determination unit 303 determines that the distance between the printing regions is equal to or larger than the distance d0, the generation unit 304 sets the illuminance, as the illuminance of the curing light for the non-printing region between the printing regions, to the minimum (for example, 0% of the basic illuminance) so that the curing light does not strike the already-formed low layer portion corresponding to the non-printing region of that target layer. Then, the process proceeds to step S20.

<Step S20>

The generation unit 304 appropriately sets the illuminance to the printing region based on the width of the printing region in the X axis direction. Then, the process proceeds to step S23.

<Step S21>

When the determination unit 303 determines that the distance between the printing regions is smaller than the distance d0, the generation unit 304 sets the illuminance, as the illuminance for the non-printing region between the printing regions, the value obtained by multiplying the basic illuminance by the predetermined percentage, which is a fixed rate (70% in the example of FIG. 9), so that the illuminance is the degree capable of preventing shortage of the light amount to the printing region. Then, the process proceeds to step S22.

<Step S22>

The generation unit 304 appropriately sets the illuminance to the printing region based on the width of the printing region in the X axis direction. Then, the process proceeds to step S23.

<Step S23>

The generation unit 304 generates an illuminance map for the target line in the X axis direction in which the fabrication operation is performed. Then, the process proceeds to step S24.

<Step S24>

The discharge control unit 305 performs discharge operation of ink by the discharge head 22 while the carriage 21 is moved along the target line by the movement control unit 302 according to the slice data of the target layer, and the irradiation control unit 306 controls the irradiation operation of the curing light of the irradiation unit 25 by the irradiation driving unit 64 according to the illuminance map. Then, the process proceeds to step S25.

<Step S25>

The controller 50 determines whether the liquid discharge apparatus 10 has completed the processing for the entire slice data undergoing the fabrication operation. When the processing has been completed for the entire slice data (step S25: Yes), the process proceeds to step S26. When the processing has not been completed (step S25: No), the process proceeds to step S28.

<Step S26>

The controller 50 determines whether the liquid discharge apparatus 10 has completed the fabrication (printing operation) for all of the print data acquired by the data acquisition unit 301, that is, all the slice data based on the print data. When the fabrication operation (printing operation) has completed (step S26: Yes), the three-dimensional object fabrication processing by the liquid discharge apparatus 10 is ended. When the fabrication operation (printing operation) has not completed (step S26: No), the process proceeds to S27.

<Step S27>

The controller 50 increments the ordinal number of the layer (target layer) for which fabrication operation is performed (n=n+1). Then, the process returns to step S12.

<Step S28>

The movement control unit 302 moves the carriage 21 by one line in the Y axis direction. After the movement by one line, the line on which the carriage 21 moves next in the Y axis direction is the target line. Then, the process returns to step S14.

Through the flow of steps S11 to S28, three-dimensional object fabrication processing by the liquid discharge apparatus 10 is performed.

As described above, in the liquid discharge apparatus 10 according to the present embodiment, the printing region and the non-printing region are grasped at each height (each layer) of the three-dimensional object to be formed, and the illuminance of curing light for each region is set depending on the state of the printing region and the non-printing region. As a result, in the fabrication of a three-dimensional object having irregularities, or the like, it is possible to suppress discoloration and image defects of the fabrication portion and the deterioration of the formed product due to excessive irradiation, suppress the uncured ink due to insufficient light amount, color mixture, and the flow out of ink to other than landing position, and improve the quality of the formed three-dimensional object.

Note that, in a case where at least a portion of the functional units of the liquid discharge apparatus 10 according to the above-described embodiment is implemented by execution of a computer program, the program can be prestored in a ROM or the like. Alternatively, the computer program executed in the liquid discharge apparatus 10 according the above-described embodiment can be provided as a file being in an installable format or an executable format and stored in a computer-readable recording medium, such as a compact disc read only memory (CD-ROM), a flexible disk (FD), a compact disc recordable (CD-R), and a digital versatile disk (DVD). Further, the program executed in the liquid discharge apparatus 10 according the above-described embodiment can be stored in a computer connected to a network such as the Internet, to be downloaded via the network. Further, the program executed in the in the liquid discharge apparatus 10 according the above-described embodiment can be provided or distributed via a network such as the Internet. The program executed in the in the liquid discharge apparatus 10 according the above-described embodiment is in the form of module including at least a portion of the above-described functional units. As actual hardware, when the CPU 51 (a processor) reads out the program from the memory (the ROM 52 or the storage 170) and executes the program, the above-described functional units are loaded and implemented (generated) on the main memory (e.g., the RAM 53).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A liquid discharge apparatus to form a three-dimensional object with a plurality of layers of ink laminated, the liquid discharge apparatus comprising:
   a stage;
   a discharge head configured to discharge photocurable ink, toward the stage, for each layer in a height direction of the three-dimensional object;
   a driver configured to move at least one of the discharge head and the stage relative to the other of the discharge head and the stage;
   an irradiation device configured to irradiate, for each layer, the ink with curing light to cure the ink; and
   circuitry configured to:
      cause the discharge head to discharge the ink, corresponding to movement of the discharge head, according to slice data indicating a printing region and a non-printing region in each layer, the slice data generated by sliding the three-dimensional object in the height direction; and
      instruct the irradiation device to change, in each layer, illuminance of the curing light irradiated by the irradiation device in the printing region and the non-printing region in the layer by anticipating an influence of the illuminance of the curing light in subsequent layers on the printing region and the non-printing region based on a state of the printing region and the non-printing region for the layer as indicated by the slice data, and irradiating the printing region and the non-printing region in the layer with the curing light at a reduced level of the illuminance based on an amount of the anticipated influence of the illuminance of the curing light in the subsequent layers.

2. The liquid discharge apparatus according to claim 1, wherein, in a case of a non-printing region between two printing regions, the circuitry is configured to instruct the irradiation device to change the illuminance in the non-printing region in accordance with a distance between the two printing regions in a main scanning direction.

3. The liquid discharge apparatus according to claim 2, wherein the circuitry is configured to:
   determine whether the distance between the two printing regions is equal to or greater than a predetermined distance, and
   inhibit irradiation with the curing light in the non-printing region in response to a determination that the distance is equal to or greater than the predetermined distance.

4. The liquid discharge apparatus according to claim 3, wherein the circuitry is configured to:
   set a reference illuminance for each layer; and
   instruct the irradiation device to change the illuminance in the non-printing region between two printing regions to a value smaller than the reference illuminance in response to a determination that the distance is smaller than the predetermined distance.

5. The liquid discharge apparatus according to claim 1, wherein the circuitry is configured to instruct the irradiation device to change the illuminance in the printing region in accordance with a width of the printing region in a main scanning direction.

6. The liquid discharge apparatus according to claim 5, wherein the circuitry is configured to:

determine whether the width of the printing region is equal to or greater than a predetermined width;

instruct the irradiation device to set the illuminance in the printing region to a first value in response to a determination that the width is equal to or greater than the predetermined width; and instruct the irradiation device to set the illuminance in the printing region to a second value higher than the first value in response to a determination that the width is smaller than the predetermined width.

7. The liquid discharge apparatus according to claim 1, wherein the circuitry is configured to:

set a reference illuminance for each layer, the reference illuminance increasing in the height direction of the three-dimensional object; and use the reference illuminance in changing the illuminance corresponding to the state of the printing region and the non-printing region.

8. The liquid discharge apparatus according to claim 1, wherein the circuitry is configured to:

generate, for each layer, an illuminance map assigning an illuminance to each region in accordance with the state of the printing region and the non-printing region indicated by the slice data; and cause the irradiation device to perform irradiation with the curing according to the illuminance map.

9. The liquid discharge apparatus according to claim 1, wherein the circuitry is configured to instruct the irradiation device to change, in each layer, the illuminance of the curing light irradiated by the irradiation device in the printing region and the non-printing region in the layer independently in accordance with the state of the printing region and the non-printing region indicated by the slice data, where the state includes one or more of a position of the layer in the height direction, a width of the printing region for the layer, and, when the non-printing region is between the printing region and an adjacent printing region, a distance between the printing region and the adjacent printing region.

10. The liquid discharge apparatus according to claim 1, wherein the irradiation device includes at least two light sources spaced apart in a main scanning direction, and the circuitry is configured to instruct the irradiation device to change, in each layer, the illuminance of the curing light irradiated by the irradiation device in the printing region and the non-printing region in the layer by independently setting, for each layer, the illuminance of the curing light irradiated by each of the at least two light sources based on the state of the printing region and the non-printing region for the layer.

11. The liquid discharge apparatus according to claim 1, wherein the circuitry is configured to instruct the irradiation device to change, in each layer, the illuminance of the curing light irradiated by the irradiation device in the printing region and the non-printing region in the layer by, for each line in the x-axis direction, determining whether the printing region includes a plurality of printing regions, determining whether a distance between the plurality of printing regions is equal to or greater than a set distance, and setting the illuminance in the non-print region between the plurality of print regions to a set illuminance greater than zero, if the distance between the plurality of printing regions is less than the set distance.

12. A liquid discharge system comprising:

a data generator configured to generate the slice data; and the liquid discharge apparatus according to claim 1.

13. A liquid discharge method for forming a three-dimensional object with a plurality of layers of ink laminated, the liquid discharge method comprising:

discharging, with a discharge head, photocurable ink, toward a stage, for each layer in a height direction of the three-dimensional object;

moving at least one of the discharge head and the stage relative to the other of the discharge head and the stage;

irradiating, for each layer, the ink with curing light using an irradiation device to cure the ink;

controlling the discharging, corresponding to movement of the discharge head, according to slice data indicating a printing region and a non-printing region in each layer, the slice data generated by sliding the three-dimensional object in the height direction; and instructing the irradiation device to change, in each layer, illuminance of the curing light irradiated by the irradiation device in the printing region and the non-printing region in the layer by anticipating an influence of the illuminance of the curing light in subsequent layers on the printing region and the non-printing region based on a state of the printing region and the non-printing region for the layer as indicated by the slice data, and irradiating the printing region and the non-printing region in the layer with the curing light at a reduced level of the illuminance based on an amount of the anticipated influence of the illuminance of the curing light in the subsequent layers.

14. The liquid discharge method according to claim 13, wherein the instructing instructs the irradiation device to change, in each layer, the illuminance of the curing light irradiated by the irradiation device in the printing region and the non-printing region in the layer independently in accordance with the state of the printing region and the non-printing region indicated by the slice data, where the state includes one or more of a position of the layer in the height direction, a width of the printing region for the layer, and, when the non-printing region is between the printing region and an adjacent printing region, a distance between the printing region and the adjacent printing region.

15. The liquid discharge method according to claim 13, wherein the irradiation device includes at least two light sources spaced apart in a main scanning direction, and the instructing instructs the irradiation device to change, in each layer, the illuminance of the curing light irradiated by the irradiation device in the printing region and the non-printing region in the layer by independently setting, for each layer, the illuminance of the curing light irradiated by each of the at least two light sources based on the state of the printing region and the non-printing region for the layer.

16. A non-transitory recording medium storing a plurality of program codes which, when executed by one or more processors, causes the processors to perform a liquid discharge method for forming a three-dimensional object with a plurality of layers of ink laminated, the method comprising:

discharging, with a discharge head, photocurable ink, toward a stage, for each layer in a height direction of the three-dimensional object;

moving at least one of the discharge head and the stage relative to the other of the discharge head and the stage;

irradiating, for each layer, the ink with curing light using an irradiation device to cure the ink;

controlling the discharging, corresponding to movement of the discharge head, according to slice data indicating a printing region and a non-printing region in each layer, the slice data generated by sliding the three-dimensional object in the height direction; and instructing the irradiation device to change, in each layer, illuminance of the curing light irradiated by the irradiation device in the printing region and the non-printing region in the layer by anticipating an influence of the illuminance of the curing light in subsequent layers on the printing region and the non-printing region based on a state of the printing region and the non-printing region for the layer as indicated by the slice data, and irradiating the printing region and the non-printing region in the layer with the curing light at a reduced level of the illuminance based on an amount of the anticipated influence of the illuminance of the curing light in the subsequent layers.

17. The non-transitory recording medium according to claim 16, wherein the instructing instructs the irradiation device to change, in each layer, the illuminance of the curing light irradiated by the irradiation device in the printing region and the non-printing region in the layer independently in accordance with the state of the printing region and the non-printing region indicated by the slice data, where the state includes one or more of a position of the layer in the height direction, a width of the printing region for the layer, and, when the non-printing region is between the printing region and an adjacent printing region, a distance between the printing region and the adjacent printing region.

18. The non-transitory recording medium according to claim 16, wherein the irradiation device includes at least two light sources spaced apart in a main scanning direction, and the instructing instructs the irradiation device to change, in each layer, the illuminance of the curing light irradiated by the irradiation device in the printing region and the non-printing region in the layer by independently setting, for each layer, the illuminance of the curing light irradiated by each of the at least two light sources based on the state of the printing region and the non-printing region for the layer.

* * * * *